A. A. TIRRILL.
ELECTRICAL REGULATOR.
APPLICATION FILED MAR. 3, 1914.
1,194,683.
Patented Aug. 15, 1916.
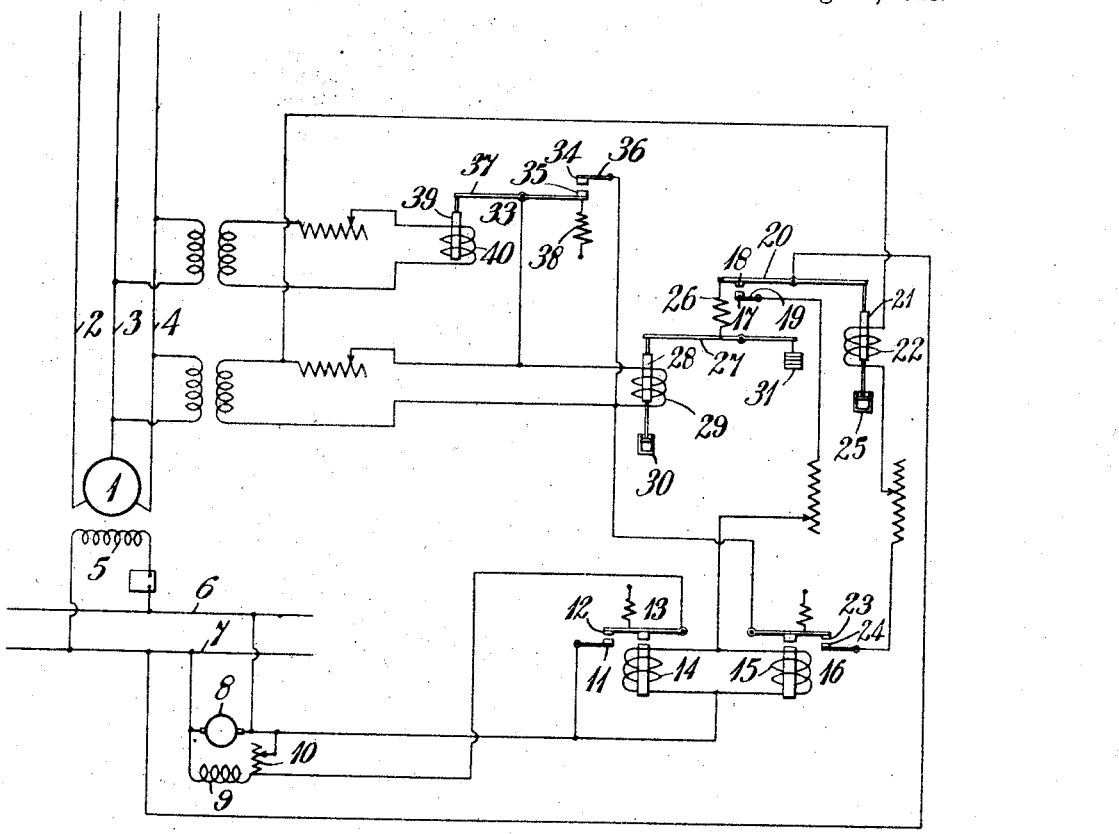
WITNESSES:
Fred H. Miller
Otto S. Schairer
INVENTOR
Allan A. Tirrill
BY
Wesley G. Carr
ATTORNEY

UNITED STATES PATENT OFFICE.

ALLEN A. TIRRILL, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL REGULATOR.

1,194,683.  Specification of Letters Patent.  Patented Aug. 15, 1916.

Application filed March 3, 1914. Serial No. 822,132.

*To all whom it may concern:*

Be it known that I, ALLEN A. TIRRILL, a citizen of the United States, and a resident of Pittsburgh, in the county of Allegheny and State of Pennsylvania, have invented a new and useful Improvement in Electrical Regulators, of which the following is a specification.

My invention relates to electrical regulators, and particularly to those in which the regulation is effected by opening and closing a shunt circuit to a resistance in circuit with the field magnet winding of an exciter or other dynamo-electric machine.

The object of my invention is to provide a regulator of the character indicated that shall be effective, reliable and accurate in operation.

In the single figure of the accompanying drawing, which diagrammatically illustrates a system of distribution embodying my invention, an electrical generator 1 supplies current to a suitable distributing circuit 2—3—4, and a field magnet winding 5 of the generator is supplied with current from exciter bus bars 6—7. An exciter 8 that is connected to the bus-bars 6—7 is provided with a field magnet winding 9 in circuit with which is a suitable variable resistor 10, the effective value of which is determined by the engagement and disengagement of a pair of coöperating stationary and movable contact terminals 11 and 12, respectively, of a relay 13.

The relay 13 is provided with an energizing winding 14 that is connected in parallel with a similar energizing winding 15 of another relay 16, and that is supplied with current from the exciter bus bars 6—7, or that may be supplied from any other suitable source. The circuit of the windings 14 and 15 is controlled by a pair of coöperating stationary and movable contact terminals 17 and 18, respectively, the former of which is resiliently mounted as, for instance, by being attached to the free end of a plate spring 19. The contact member 18 is carried by a lever 20 that is actuated by an electromagnet comprising a core 21 and an energizing winding 22, the circuit of an energizing winding 22 being controlled by contact said winding being controlled by contact terminals 23 and 24 of the relay 16. The movements of the contact terminal 18, the lever 20 and the core 21, are retarded by means of a dash pot 25.

The attractive force of the winding 22 is opposed by a spring 26, the ends of which are respectively attached to one end of the lever 20 and to another lever 27 at one side of its pivotal point. The lever 27 is actuated by means of an electromagnet comprising a core 28 and an energizing winding 29, its movements being retarded by means of a dash pot 30. A counterweight 31 is provided at the opposite end of the lever 27 to that to which the core 28 is attached, and the combined effect of the spring 26 and the counterweight 31 is to slightly overbalance the weight of the core 28. The variations of the position of the lever 27 that are caused by the winding 29 serve to vary the force exerted by the spring 26 upon the lever 20, or, in other words, the force opposed to the attraction of the winding 22.

The winding 29 receives current from the distributing circuit 2—3—4, though, if desired, it may receive current from any other suitable source. The degree of energization of the winding 29 is controlled by means of a relay 33 comprising a pair of coöperating stationary and movable contact members 34 and 35, respectively, the former of which is preferably resiliently mounted as by being attached to the free end of a plate spring 36. The contact terminal 35 is carried by a lever 37 having a spring 38 at one end tending to separate the contact terminals 34 and 35, and an electromagnet at its other end, the core member 39 of which is attached thereto. The core member 39 is surrounded by energizing winding 40 that receives current proportional to the voltage of the distributing circuit 2—3—4. The position of the contact terminal 35 is accordingly varied, causing it to vibrate into and out of engagement with the terminal 34, in accordance with variations of the voltage of the distributing circuit, though, if desired, its position may be varied in accordance with the variation of any other electrical condition of the circuit or system.

If, during the operation of the system, the load upon the distributing circuit 2—3—4 increases to such an extent as to cause a decrease in voltage, the spring 38 will slightly overpower the attractive force of the coil 40, and the contact terminals 34 and 35 will be separated. Upon separation of the said contact members, the winding 29 becomes more strongly energized, and a greater force is then exerted upon the spring 26, which tends to cause the contact terminal 18 to engage the terminal 17. Upon engagement of the contact terminals 17 and 18, the circuit of the coils 14 and 15 is established, and the contact terminals of the relays 13 and 16 are brought into engagement. The engagement of the contact terminals 11 and 12 shunts the exciter field resistor 10 with the result that the exciter and generator voltages are somewhat increased. Engagement of the contact terminals 23 and 24 establishes the circuit of the coil 22, which thereupon separates the contact terminals 17 and 18. Upon separation of the contact terminals 17 and 18, the circuit of the coil 22 is again interrupted and the said coil, therefore, serves in conjunction with the spring 26 to vibrate the contact terminal 18 into and out of engagement with the terminal 17. The relation of the periods of engagement and disengagement of the said contact terminals is determined by the force exerted by the spring 26 which, in turn, is determined by the coil 29. The degree of energization of the winding 29 is determined by the relay 33, the operation of which is governed by the voltage or other electrical condition of the distributing circuit. Consequently, the relation of the periods of engagement and disengagement of the contact terminals 17 and 18 ultimately depends upon the voltage or other electrical condition of the circuit 2—3—4. The arrangement is such that, when the voltage upon the circuit 2—3—4 decreases, the exciter field resistor 10 will be shunted for a shorter average period in the manner before explained, while, upon an increase of voltage of the distributing circuit, the said resistor will be shunted for a longer average period.

I claim as my invention:

1. An electrical regulator comprising coöperating stationary and movable contact members, a lever carrying the movable contact member, an electromagnet for actuating said lever, a second lever, resilient means interposed between the two levers and constituting the sole means whereby one may actuate the other, and means for actuating the second lever in accordance with variations of the quantity regulated.

2. An electrical regulator comprising coöperating stationary and movable contact members, a lever carrying the movable contact member, an electromagnet for actuating said lever, a second lever, resilient means interposed between the two levers and constituting the sole means whereby one may actuate the other, an electromagnet for actuating the second lever, and a relay for controlling the energization of the said electromagnet in accordance with variations of the quantity regulated.

In testimony whereof, I have hereunto subscribed my name this 20th day of Feb., 1914.

ALLEN A. TIRRILL.

Witnesses:
 OTTO S. SCHAIVER,
 B. B. HINES.